United States Patent [19]

Bodine

[11] Patent Number: 4,883,532
[45] Date of Patent: * Nov. 28, 1989

[54] SONIC METHOD FOR FACILITATING THE EXTRACTION OF MINERALS FROM ORE IN A LEACHANT

[76] Inventor: Albert G. Bodine, 7877 Woodley Ave., Van Nuys, Calif. 91406

[*] Notice: The portion of the term of this patent subsequent to Oct. 25, 2005 has been disclaimed.

[21] Appl. No.: 222,895

[22] Filed: Jul. 22, 1988

Related U.S. Application Data

[63] Continuation-in-part of Ser. No. 128,454, Dec. 3, 1987, Pat. No. 4,780,138, which is a continuation of Ser. No. 923,575, Oct. 27, 1986, abandoned.

[51] Int. Cl.$^4$ ............................ C22B 3/00; C22B 3/02
[52] U.S. Cl. ........................................ 75/101 R; 75/2; 422/127; 422/269; 422/281; 266/101; 423/1; 423/20; 423/27; 423/50; 423/34; 423/55; 423/65; 423/71; 423/85; 423/92; 423/101; 423/122; 423/140; 423/155; 423/184; 366/118; 366/123; 366/124; 366/128; 366/600; 310/81; 210/702; 210/748
[58] Field of Search ............ 422/127, 269, 281; 75/101 R, 2; 266/101; 423/1, 20, 27, 50, 34, 55, 65, 71, 85, 92, 101, 102, 140, 155, 184; 366/118, 123, 124, 128, 600; 310/81; 210/703, 702, 723, 738, 748, 747; 209/5

[56] References Cited

U.S. PATENT DOCUMENTS

| | | | |
|---|---|---|---|
| 2,360,803 | 10/1944 | Steuerman | 310/81 |
| 2,366,342 | 1/1945 | Lazan | 310/81 |
| 3,525,606 | 8/1970 | Mackenzie et al. | 422/281 |
| 4,265,129 | 5/1981 | Bodine | 74/61 |
| 4,566,800 | 1/1986 | Bodine | 366/118 |
| 4,604,369 | 8/1986 | Shi | 501/148 |
| 4,652,309 | 3/1987 | Mackenzie et al. | 366/128 |
| 4,778,279 | 10/1988 | Bodine | 366/118 |
| 4,780,138 | 10/1988 | Bodine | 75/101 R |

FOREIGN PATENT DOCUMENTS

| | | | |
|---|---|---|---|
| 553651 | 1/1959 | Belgium | 310/81 |
| 2152728 | 8/1985 | Belgium | 423/68 |
| 474822 | 10/1952 | Italy | 310/81 |

Primary Examiner—Robert L. Stoll
Assistant Examiner—Paige C. Harvey
Attorney, Agent, or Firm—Edward A. Sokolski

[57] ABSTRACT

An elastic bar member is clamped to an orbiting mass oscillator and the entire assembly is suspended from a cable or the like such that the bar member has freedom of lateral motion and is nakedly immersed in a leachant having a material contained therein such as a mineral ore from which metal is to be extracted. The rotor of the orbiting mass oscillator is driven at a speed such as to generate cycloidal sonic energy in the bar preferably at a frequency such as to set up resonant standing wave vibration of the bar in a cycloidal nutating pattern. The cycloidal vibrational energy tends to set the surrounding fluid material into a whirling rotation or rotary traveling wave which facilitates the mixing of the ore and leachant and enhances the leaching operation to make for more complete separation of the mineral from the ore.

4 Claims, 3 Drawing Sheets

SONIC METHOD FOR FACILITATING THE EXTRACTION OF MINERALS FROM ORE IN A LEACHANT

This application is a continuation in part of my application Ser. No. 128,454 filed Dec. 3, 1987 now U.S. Pat. No. 4,780,138 which is a continuation of my application Ser. No. 923,575, filed Oct. 27, 1986 now ABN.

The leaching or extraction of metals from ore involves the utilization of a solution in which a material such as a metal is separated from the ore, the leachant effectively dissolving the material to be extracted. As described in my U.S. Pat. Nos. 3,525,606 and 4,566,800, this leaching process can be greatly enhanced by applying sonic energy to the leaching solution and the work material contained therein.

In the system of the aforementioned U.S. Pat. No. 4,566,800, a bar member is sonically driven by an orbiting mass oscillator at a frequency such as to set up resonant standing wave vibration therein, this bar member being immersed in the leachant. In this system, the resonantly driven bar member is supported on a rod which fits into a bored out portion of the bar member and touches the bar member only at the point of a node of the resonant standing wave pattern, thereby minimizing the dissipation of the sonic energy in the surrounding housing. This system, however, has a significant disadvantage in that the resonant bar member is supported so as to impose a gravity induced longitudinal compressional force on the bar. This compressional force tends to impede the desired lateral vibration of the bar, placing elastic stress thereon and upon the lateral support guidance structure which results in reduced vibrational output. Further, in the device described in the aforementioned patent, it is necessary to employ sidewise support spokes and other such support components. The use of such support components has a disadvantage of providing interference with the vibrational waves radiated from the bar into the leachant. Further these components tend to become contaminated by the leachant which presents undesirable maintenance problems. The system of the present invention obviates the aforementioned shortcomings of the prior art by clamping the radiating bar member to the oscillator housing and suspending the assembly thus formed from above by means of a cable support or the like. The bar member thus is suspended from above in the leachant in tension by virtue of gravity so that it hangs freely therein with no need for sidewise support members. Further, the suspension of the bar member for freedom of lateral motion permits the bar member to respond to the quadrature acoustical energy with a cycloidal nutating motion (without rotation of the bar about its longitudinal axis) which tends to set the surrounding fluid material in a whirling rotation.

The sonically actuated bar is "naked" in the sense that is is free and unconfined with no interference with its radiation of complex wave energy except for its attachment at one end to the oscillator housing, and there are no frame or cage members around the bar to disrupt the complex wave energy radiating therefrom. The whirling bar with its circular orbit acts openly on the ore and leachant held within containment means, such as a tank having a diameter much greater than that of the bar, to deliver a cyclic force thereto with a deflected force vector having a shear wave with a tangential tearing effect which greatly aids the mixing of the ore and leachant. Where the ore is in the form of a slurry in suspension in the leachant or in a fluid powder mixture therein, the shear wave is particularly effective in view of the viscosity of the load, the complex wave vectors generated by the substantially exposed bar being particularly effective in mixing the ore and leachant and separating the mineral from the ore.

It is therefore an object of this invention to improve the efficiency of sonic leaching apparatus by freely suspending the bar radiating the sonic energy for freedom of lateral motion in the leachant.

It is further object of this invention to lessen the maintenance requirements in a sonic leaching system.

It is still another object of this invention to provide means for minimizing the compressional forces on a sonic bar used in leaching so as to permit optimal radiation of sidewise cycloidal energy therefrom.

Other objects of the invention will become apparent as the description proceeds in connection of the accompanying drawings of which:

FIG. 1 is a side elevational view of a preferred embodiment of the invention; and FIGS. 2A and 2B are side elevational views with partial cutaway sections illustrating the structural details of the preferred embodiment.

Briefly described the system of the invention comprises a bar member fabricated of an elastic material such as steel which is clamped to the housing of an oscillator designed to generate cycloidal vibrational energy at a sonic frequency. This oscillator may be of the orbiting mass type or may employ other types of excitation such as provided by another type of mechanical vibratory drive or by a magnetic, magneto-strictive or hydraulic vibratory drive. The bar member is supported for freedom of lateral motion in a leachant containing ore material from which a metal or the like is to be separated. The bar member may be suspended in the leachant by means of a cable or the like which may be attached to the housing assembly in which the orbiting mass oscillator is contained. The oscillator is preferably driven at a speed such as to effect a resonant standing wave cycloidal vibration of the bar member at a sonic frequency, this sonic energy aiding the separation of the product material from the ore into the leachant.

In order to facilitate the comprehension of the operation of the device of the invention, it is helpful to make an analogy between an electrical resonant circuit and a mechanical resonant circuit. This type of an analogy is well known to those skilled in the art, and is described for example, in chapter 2 of "Sonics" by Hueter and Bolt published in 1955 by John Wiley & Sons. In making such an analogy, force F is equated with electrical voltage E, velocity of vibration u is equated with electrical current i, mechanical compliance $C_m$ is equated with electrical capacitance $C_e$, mass is equated with electrical inductance L, mechanical resistance (such as friction) $R_m$ is equated with electrical resistance R. Mechanical impedance $Z_m$ is equated with electrical impedance $Z_e$. Thus, it can be shown that if a member is elastically vibrated by a sinusoidal force $F_o \sin \omega t$, being equal to $2\pi$ times the frequency vibration, $$Z_m = R_m + j\left(\omega M - \frac{1}{\omega C_m}\right) = \frac{F_o \sin \omega t}{u} \quad (1)$$

Where $\omega M$ is equal to $$\frac{1}{\omega C_m}$$

a resonant condition exists, and the effective mechanical impedance $Z_m$ is equal to the mechanical resistance $R_m$, the reactive impedance components $\omega M$ and $1/\omega C_m$ cancelling each other out. Under such a resonant condition, velocity of vibration U is at a maximum, effective power factor is unity, and energy is most efficiently delivered to the object being vibrated. It is such a high efficiency resonant condition in the elastic system being driven that is preferably utilized in the method and device of this invention to achieve the desired end results.

It is to be noted by reference to Equation 1 that velocity of vibration u is highest where impedance $Z_m$ is lowest, and vice versa. Therefore, a high-impedance load will tend to vibrate at relatively low velocity, and vice versa. Thus at an interface between high- and low-impedance elements, a high relative movement results by virtue of such impedance mismatch which, as in the equivalent electrical circuit, results in a high reflected wave. Such an impedance mismatch condition between a resonator bar, the wall of the tank and the material in the leachant can be utilized to free the mineral from the ore.

Just as the sharpness of resonance of an electrical circuit is defined as the "Q" thereof, and is indicative of the ratio of energy store to the energy used in each cycle, so also the "Q" of the mechanical resonant circuit has the same significance and is equal to the ratio between $\omega M$ and $R_m$. Thus, high efficiency and considerable resonant circuit for high "Q".

Of particular significance is the implementation of the method and device of this invention, is the high acceleration of the components of the elastic resonant system that can be achieved at sonic frequencies. The acceleration of a vibrating mass is a function of the square of the frequency of the drive signal times the amplitude of vibration. This can be shown as follows:

The instantaneous displacement y of a sinusoidally vibrating mass can be represented by the following equation:

$$y = Y \cos \omega t \quad (2)$$

where Y is the maximum displacement in the vibration cycle and a is equal to $2\pi f$, f being the frequency of vibration.

The acceleration of "a" of the mass can be obtained by differentiating Equation 2 twice, as follows:

$$a = \frac{d^2 y}{dt^2} = Y\omega^2 \cos(\omega t) \quad (3)$$

The acceleration "a" thus is a function of Y times $(2\pi f)^2$. At resonance, Y is at a maximum and thus even at moderately high sonic frequencies, very high accelerations are achieved.

In considering Equation 1, several factors should be kept in mind. Firstly, this equation represents the total effective resistance, mass, and compliance in a mechanical circuit, and these parameters are generally distributed throughout the system rather than being lumped in any one component or portion thereof. Secondly, the vibrating system often includes not only the resonator but the leaching composition and material therein.

Thirdly, an orbiting mass oscillator is utilized with the device of the invention that automatically adjusts its output frequency to maintain resonance with changes in the characteristics of the load. Thus, in situations where we are dealing with a fluid material which can contain varying amount of solid raw material and thereby change its characteristics, the system automatically is maintained at optimum resonant operation by virtue of the "lock-in" characteristics of applicant's unique orbiting-mass oscillators. With these basic considerations in mind, let us now turn to the specific embodiments of the device of the invention.

Figure 1:
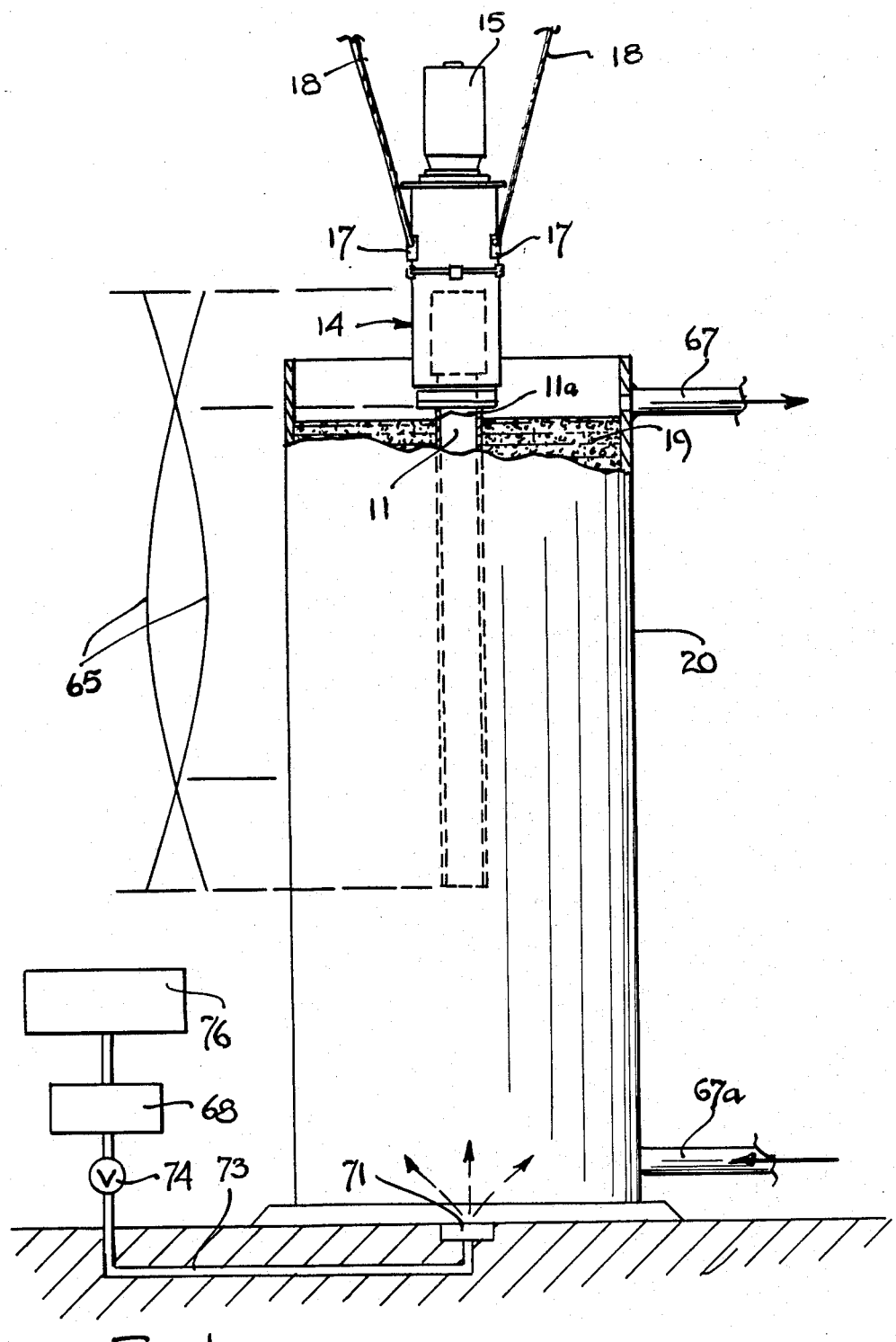
Referring now to FIG. 1, a preferred embodiment of the invention is illustrated. Bar member 11 is clamped to the casing of an orbiting mass oscillator contained within housing 14 by means to be described further on in the specification. Mounted on housing 14 is a hydraulic motor 15 which rotatably drives the rotor of the oscillator contained within the housing. Housing 14 has hooks 17 welded thereto to which cables 18 or chains are attached, the cables being connected to a suitable lift (not shown) from which the entire assembly is supported with the bar member immersed in the leaching solution 19 contained within leaching contaminant means formed by tank 20. Also contained within tank 20 is a parent material such as a mineral from which ore is to be extracted or leached into the solution. Bar member 11 has an elastomeric coating 11a thereon to protect it from the chemical environment of the leaching solution. The rotor of the oscillator is driven by motor 15 at a speed such as to set up resonant elastic vibration of bar member 11 in a cycloidal vibrational mode as indicated by graph lines 65.

Air may be introduced into the leaching solution at a controlled rate to optimize cavitation in the liquid which enhances the ore extraction. It has been found that the chemical kinetics involved in the leaching of minerals benefits considerably from having adequate amounts of oxygen as contained in air dispersed throughout the solution. The sonic wave action of the resonant bar is particularly effective for aiding such dispersion. It is essential, however, that the amount of air so added be controlled in view of the fact that too much air develops an emulsion type condition in the solution which tends to inhibit cavitation.

An air compressor 76 has a pressure regulator 68 and an air flow control 74 installed in its output line 73. Line 73 is connected to an inlet 71 in the bottom of tank 20. Thus, air in a regulated controlled flow is introduced into the solution 19 contained in the tank in the sonic field of the energy radiated by bar 11 so that the air is dispersed into minute bubbles as it rises by gravity or liquid pressure around and past the sonic bar 11. It is to be noted that the air should preferably be introduced so that it follows the liquid flow past the bar. Thus, in situations where the liquid flow is downward rather than upward, it is preferable to introduce the air at an upper portion of the tank so it is swept downwardly past the bar.

It is significant to note that in some situations only a few minutes or even less than a minute is required to obtain the desired leaching action. Also, in some situations, the air entrained in the liquid in view of its exposure to the ambient atmosphere can suffice to achieve the desired end results. However, in most situations, strong cavitation in the liquid will evacuate a substantial amount of the air from the liquid, so that unless leaching is achieved in a relatively short time (usually less than a half hour), the controlled addition of air as indicated above is required.

The vibrational energy, as described in my prior U.S. Pat. No. 4,566,800, greatly enhances the separation of the product material from the parent material by virtue of its dissolution in the leaching solution from which it can subsequently be removed. It is to be noted that the invention can be used to equal advantage where the leachant and ore form a slurry mixture or where the ore and leachant are in the form of a fluid powder mixture.

Figure 2A:
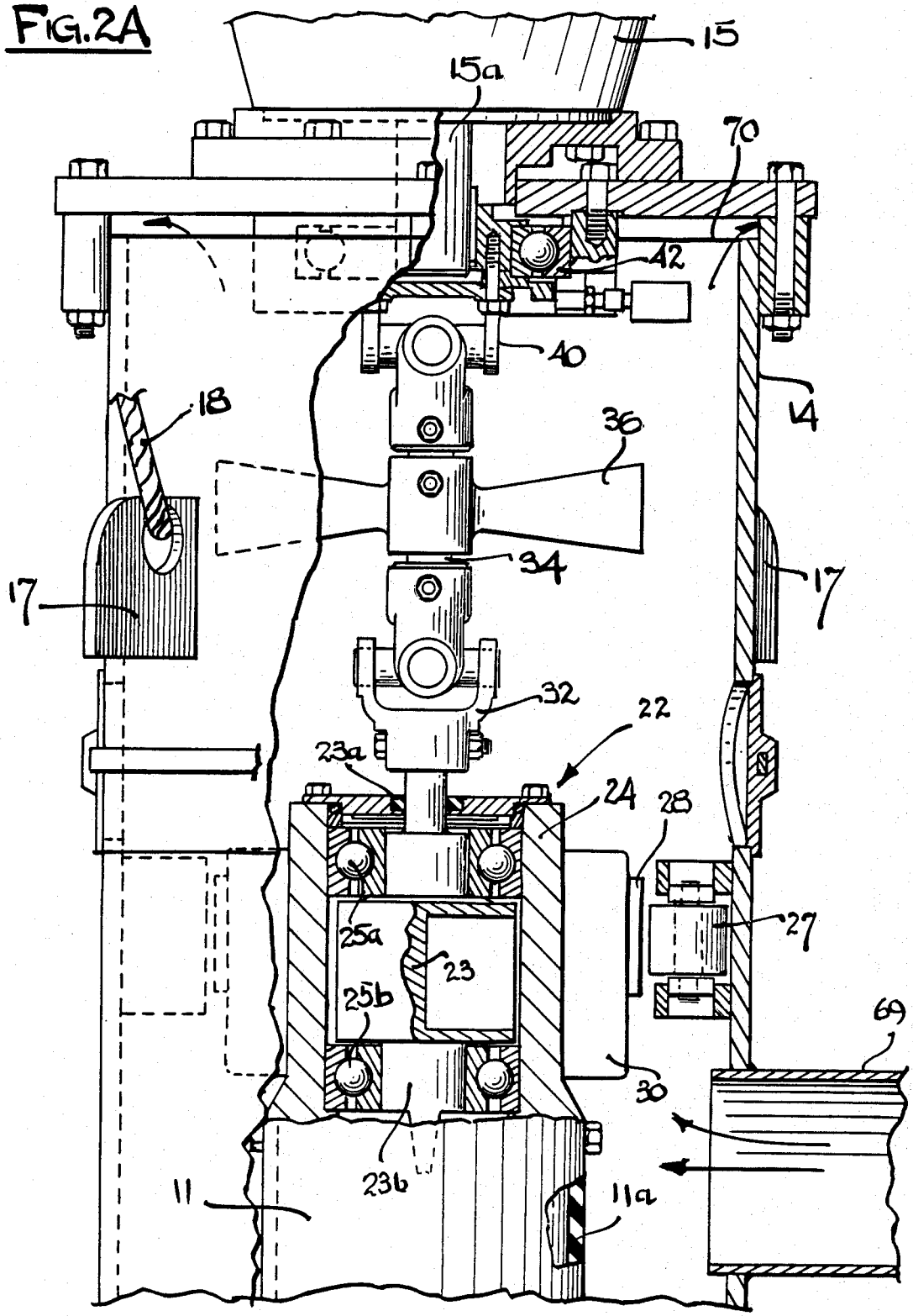
Figure 2B:
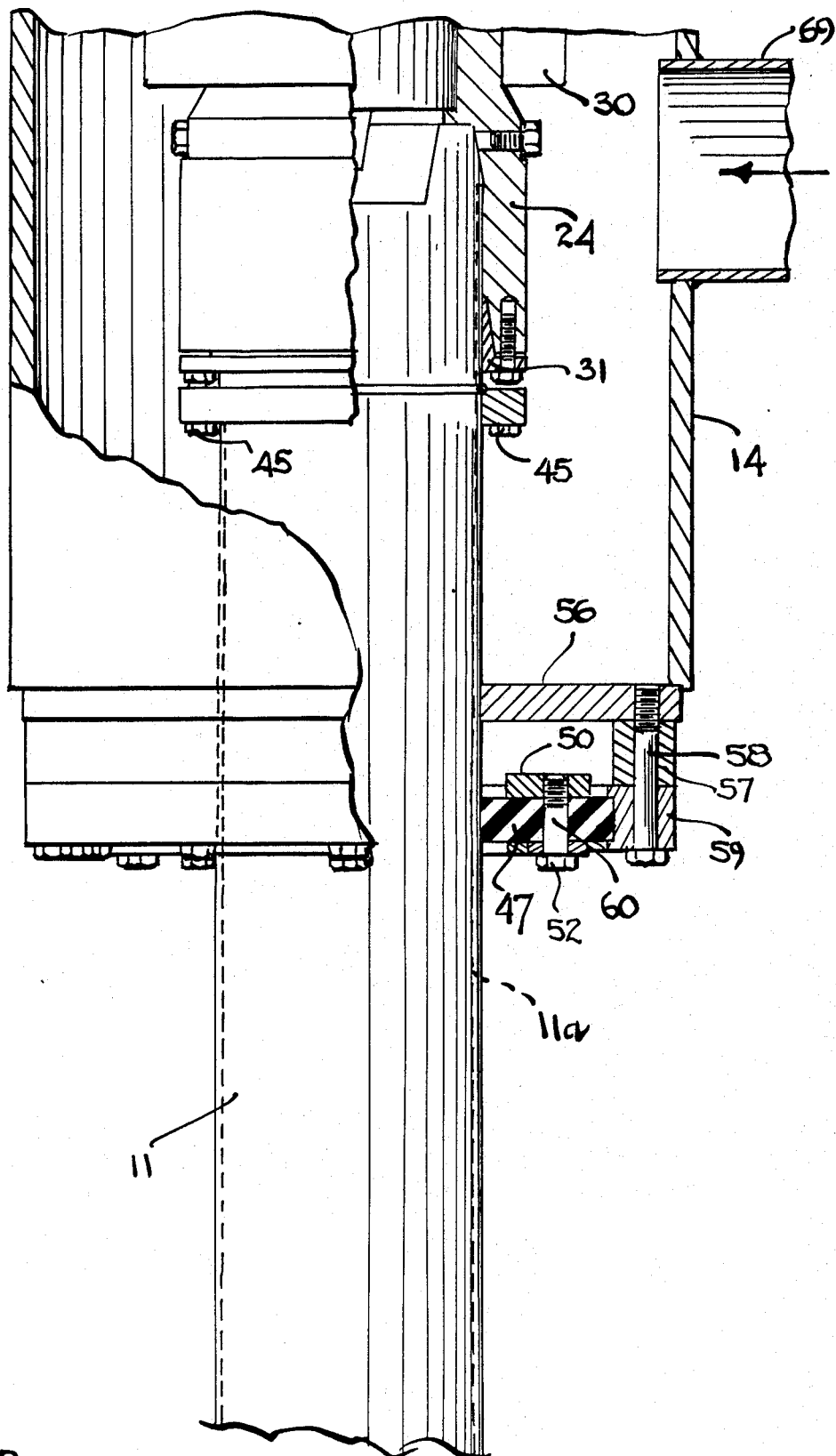

Referring now to FIGS. 2A and 2B, the structural details of the preferred embodiment are illustrated. Orbiting mass oscillator 22 has an eccentric rotor 23, the shafts 23a and 23b of the rotor being mounted for rotation in housing 24 on roller or ball bearing assemblies 25a and 25b, respectively. Rubber roller bumpers 27 are rotatably mounted on the inner wall of housing 14 and operate in conjunction with a rubber annular bumper 28 mounted on annular member 30 which is attached to the oscillator housing, to stabilize and align the oscillator housing 24 within the main housing 14.

Oscillator shaft portion 23a is coupled by means of U-joint 32 to shaft 34 which also provides a drive shaft for cooling fan 36. The upper end of shaft 34 is in turn coupled through U-joint 40 to the drive shaft 15a of motor 15. Shaft 15a and U-joint 40 are supported for rotation on roller bearing assembly 42 which is mounted on housing 14.

Referring now to FIG. 2B, oscillator housing 24 is clamped to bar member 11 by means of wedge clamping ring 31 which is retained in clamping engagement against the bar by means of bolts 45. Ring member 59 is spaced from end plate 56 by means of spacer 57 and supported on the end plate which is welded to the end of housing 14, such support being achieved by means of bolts 58 which threadably engage end plate 56. Sandwiched between circular plates 50 and 52 is a rubber bushing 47, this bushing being compressed between the plates by means of bolts 60 and thus compressively retained between ring 59 and bar 11. Bushing 47 is thus made to grip the outer wall of bar 11 thereby centering the bar in position within housing 14. The cooling fan 36 induces air into port 69, past fins 30 and through vent 70. The weight of bar 11 is carried in tension by virtue of gravity on the bearing assembly 25a-25b which in turn is supported through the linkage provided by U-joints 32 and 40, shaft 34 and roller bearing 42.

Oscillator rotor 23 is rotatably driven by motor 15 at a speed such as to set up resonant cycloidal vibration in bar 11 as indicated by the graph lines 65 in FIG. 1. As can be seen, a node of the standing wave vibrational pattern appears in the region where the bar is being gripped to the housing by rubber bushing 47. Bar member 11 is free to operate in the nature of a stirring rod in response to the cycloidal vibrational energy, being freely suspended in tension by virtue of gravity within the leaching solution 19. As for the device of my U.S. Pat. No. 4,566,800 the product to be separated is dissolved in the leaching solution by virtue of the chemical action of the leachant in combination with the sonic action provided by the energy radiated from bar 11. The leaching solution containing such product may be pumped out from tank 20 through outlet 67 by suitable pumping action after being introduced through inlet 67a.

While the invention has been described and illustrated in detail, it is to be clearly understood that this is intended by way of illustration and example only and is not to be taken by way of limitation, the spirit and scope of the invention being limited only by the terms of the following claims.

I claim:

1. A method for facilitating the separation of mineral from ore in a leachant comprising the steps of:
   attaching an oscillator to one end of a bar member of an elastic material,
   supporting said oscillator with said bar member suspended in tension in said leachant and ore without any sidewise support for freedom of lateral motion throughout substantially the entire extent of said bar member; and
   driving said oscillator so as to cause cycloidal resonant standing wave vibration of said bar member to effect nutating motion of said bar member throughout the longitudinal extent thereof,
   whereby sonic energy is transferred from said bar member to the leachant and ore to set up force vectors therein both normal and tangential to said bar member thereby facilitating the mixing of the ore and leachant and engendering the separation of the mineral from the ore.

2. The method of claim 1 wherein said oscillator is contained within and suspended from a housing.

3. The method of claim 2 and further including the step of aligning and stabilizing the oscillator within the housing by placing resilient bumper means between said oscillator and said housing.

4. The method of claim 2 and further including centering said bar member in said housing, by means of an end plate attached to the bottom end of said housing having a resilient annular bushing retained thereto said bushing being held in abutment against the bar member.

* * * * *